(12) United States Patent
Park

(10) Patent No.: US 11,216,380 B2
(45) Date of Patent: Jan. 4, 2022

(54) CONTROLLER AND OPERATION METHOD THEREOF FOR CACHING PLURAL PIECES OF MAP DATA READ FROM MEMORY DEVICE

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 105 days.

(21) Appl. No.: 16/393,629

(22) Filed: Apr. 24, 2019

(65) Prior Publication Data

US 2020/0073813 A1 Mar. 5, 2020

(30) Foreign Application Priority Data

Aug. 31, 2018 (KR) .................. 10-2018-0103739

(51) Int. Cl.
*G06F 12/0873* (2016.01)
*G06F 12/0893* (2016.01)
*G06F 9/30* (2018.01)
*G06F 3/06* (2006.01)

(52) U.S. Cl.
CPC .......... *G06F 12/0873* (2013.01); *G06F 3/061* (2013.01); *G06F 3/064* (2013.01); *G06F 3/0673* (2013.01); *G06F 9/30047* (2013.01); *G06F 12/0893* (2013.01); *G06F 2212/608* (2013.01)

(58) Field of Classification Search
None
See application file for complete search history.

(56) References Cited

U.S. PATENT DOCUMENTS

| 8,176,252 | B1 * | 5/2012 | Alexander | G06F 13/28 |
| | | | | 711/118 |
| 8,478,799 | B2 * | 7/2013 | Beaverson | G06F 16/128 |
| | | | | 707/823 |
| 2015/0261441 | A1 * | 9/2015 | Benhase | G06F 12/122 |
| | | | | 711/103 |
| 2016/0350003 | A1 * | 12/2016 | Kanno | G06F 3/0688 |
| 2017/0109042 | A1 * | 4/2017 | Ke | G06F 12/0246 |
| 2020/0073805 | A1 * | 3/2020 | Park | G06F 12/0815 |

FOREIGN PATENT DOCUMENTS

KR 10-2008-0075608 8/2008

* cited by examiner

*Primary Examiner* — Charles Rones
*Assistant Examiner* — Ryan Dare
(74) *Attorney, Agent, or Firm* — IP & T Group LLP

(57) ABSTRACT

Provided is an operation method of a controller which controls a memory device. The operation method may include: determining a caching order of plural pieces of map data included in a request map segment including request map data; requesting the request map segment from the memory device; marking data in a marking region which is determined based on the caching order; caching, in the caching order, the plural pieces of map data read from the memory device; and acquiring the request map data from the cached data, depending on whether the data stored in the marking region is changed.

20 Claims, 24 Drawing Sheets

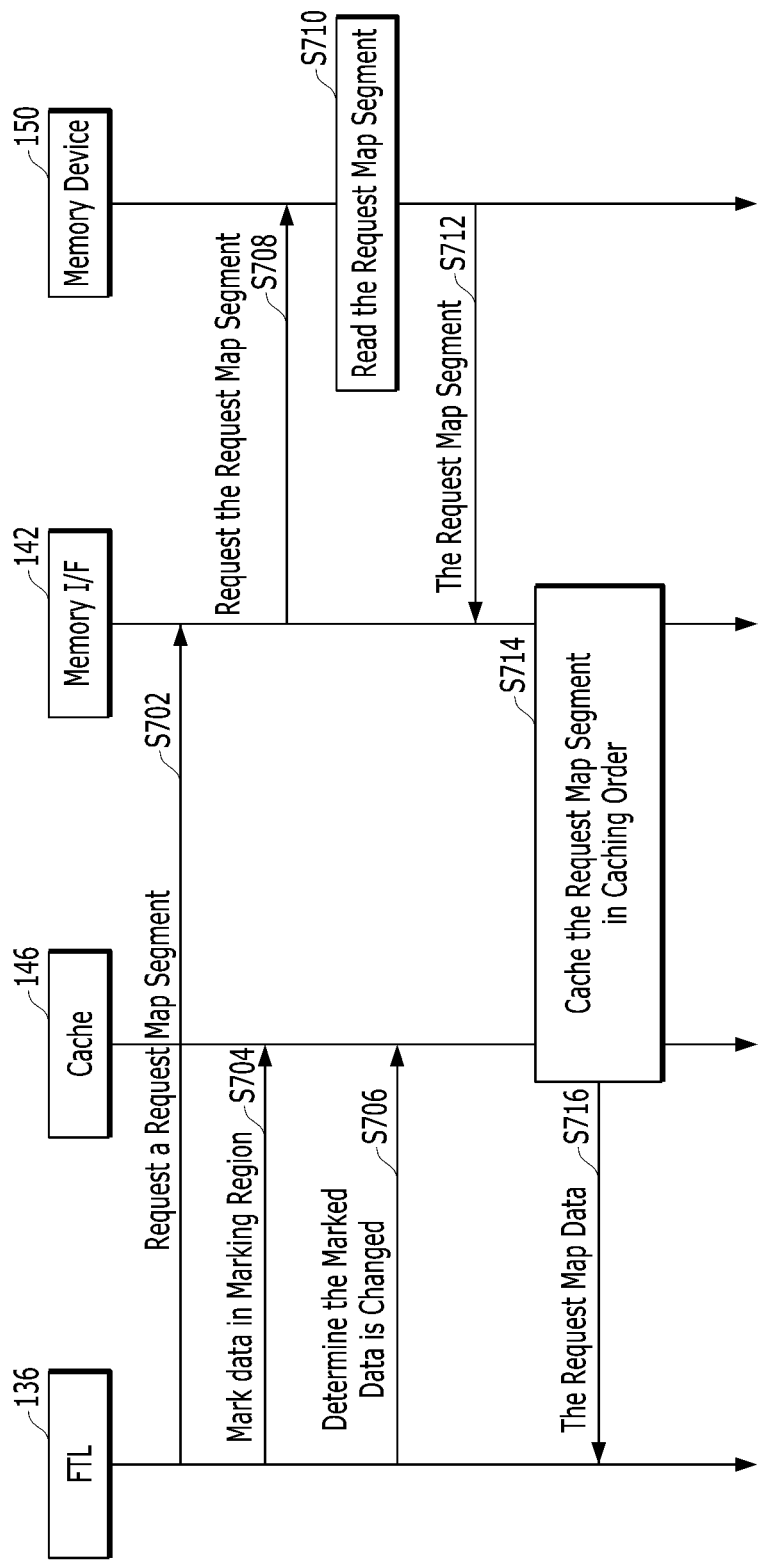

CONTROLLER AND OPERATION METHOD THEREOF FOR CACHING PLURAL PIECES OF MAP DATA READ FROM MEMORY DEVICE

CROSS-REFERENCE TO RELATED APPLICATION

This application claims priority under 35 U.S.C. § 119 to Korean Patent Application No. 10-2018-0103739, filed on Aug. 31, 2018, which is incorporated herein by reference in its entirety.

BACKGROUND

1. Field

Various embodiments of the present disclosure generally relate to a controller. Particularly, the embodiments relate to an operation method of a controller which controls a memory device.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to a controller capable of improving the access performance of a memory system by rapidly acquiring map data from a memory device, and an operation method thereof.

In an embodiment, there is provided an operation method of a controller which controls a memory device. The operation method may include: determining a caching order of plural pieces of map data included in a request map segment including request map data; requesting the request map segment from the memory device; marking data in a marking region which is determined based on the caching order; caching, in the caching order, the plural pieces of map data read from the memory device; and acquiring the request map data from the cached data, depending on whether the data stored in the marking region is changed.

In an embodiment, a controller for controlling a memory device may include: a cache suitable for caching map data; a flash translation layer (FTL) suitable for determining a caching order of plural pieces of map data included in a request map segment including request map data, requesting the request map segment from the memory device, and marking data in a marking region which is determined based on the caching order; and a memory interface suitable for caching, in the caching order, the plural pieces of map data read from the memory device, wherein the FTL acquires the request map data from the cache depending on whether the data stored in the marking region is changed.

In an embodiment, a method of operating a controller including a cache, the method includes: determining, as a caching order, a forward or a reverse order of logical addresses respectively corresponding to plural pieces of map data including request map data sequentially arranged in the forward order within a request map segment; detecting a subsequent piece of the map data as cached in the cache while caching the map data into the cache according to the caching order; and acquiring the request map data.

The reverse order may be determined as the caching order when a position of the request map data is within a latter half of the request map segment.

BRIEF DESCRIPTION OF THE DRAWINGS

FIG. 7 is a flowchart illustrating an operation of the memory system including the controller in accordance with an embodiment.

DETAILED DESCRIPTION

Various embodiments will be described in detail with reference to the accompanying drawings. The following description focuses on elements and operations in accordance with embodiments; description of well-known technical details are omitted in order not to unnecessarily obscure subject matter of the embodiments.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

It is further noted that throughout the specification, reference to "an embodiment," "another embodiment" or the like is not necessarily to only one embodiment, and different references to any such phrase are not necessarily to the same embodiment(s).

Hereinafter, the various embodiments of the present disclosure will be described in detail with reference to the attached drawings.

Figure 1:
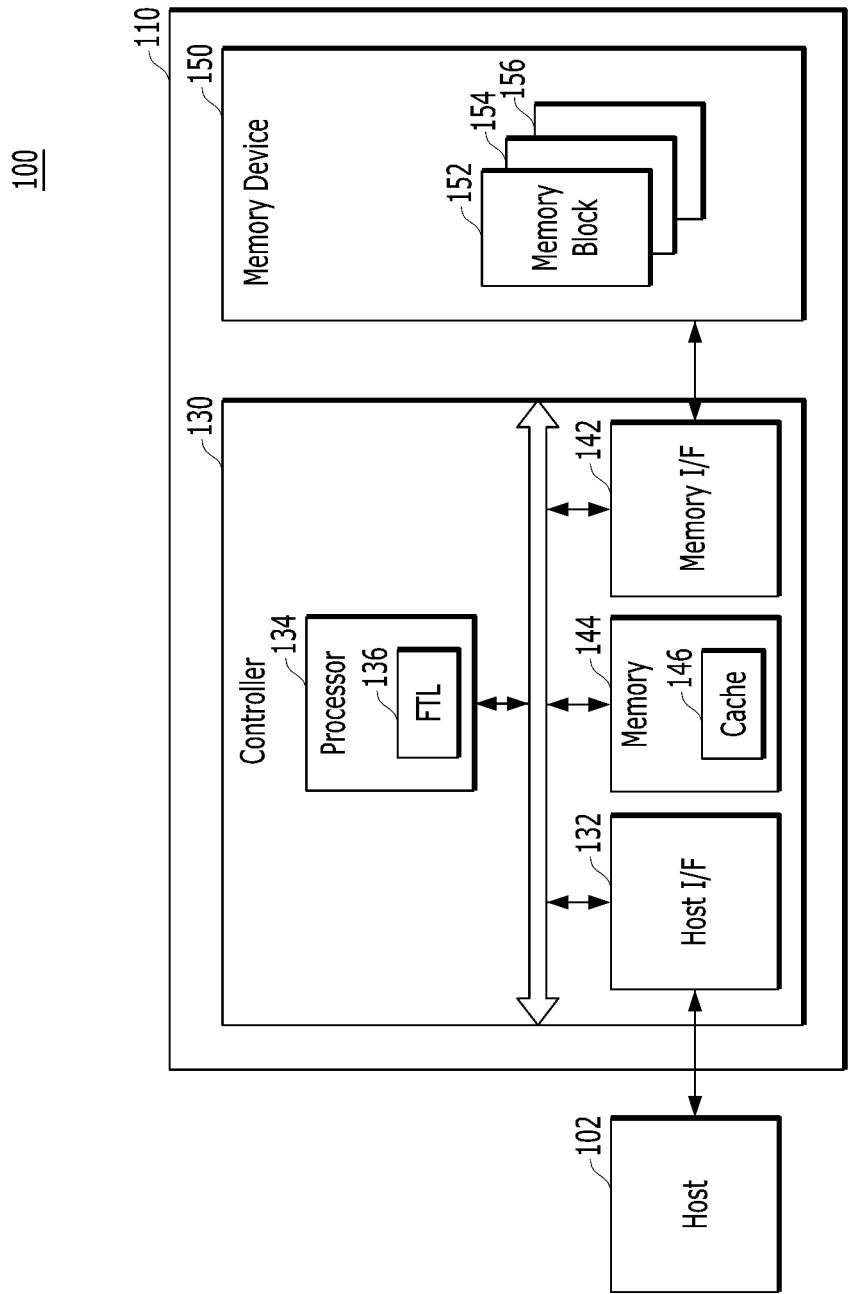
FIG. 1 schematically illustrates a memory system including a controller in accordance with an embodiment.

FIG. 1 schematically illustrates a data processing system 100 including a controller 130 in accordance with an embodiment.

Referring to FIG. 1, the data processing system 100 may include a host 102 and a memory system 110. The memory system 110 may store data therein or output data stored therein according to a request of the host 102.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and/or micro-MMC. The SD card may include a mini-SD card and/or micro-SD card.

The memory system 110 may be embodied by various types of storage devices. Examples of such storage devices may include, but are not limited to, volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device, which may be included in any of the various types of memory systems exemplified above. For example, the controller 130 and the memory device 150 may be integrated as one semiconductor device to constitute a solid state drive (SSD). When the memory system 110 is used as an SSD, the operating speed of the host 102 connected to the memory system 110 can be improved. In another embodiment, the controller 130 and the memory device 150 may be integrated as one semiconductor device to constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD, micro-SD and SDHC, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152, 154, 156, each of which may include a plurality of pages, and each of the pages may include a plurality of memory cells coupled to a word line. In an embodiment, the memory device 150 may be a flash memory. The flash memory may have a 3-dimensional (3D) stack structure.

The structure of the memory device 150 will be described in more detail with reference to FIG. 2.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, a memory I/F 142 such as a NAND flash controller (NFC), a memory 144 all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may include an ECC component (not illustrated).

The ECC component may detect and correct an error contained in the data read from the memory device 150. In other words, the ECC component may perform an error correction decoding process to the data read from the memory device 150 through an ECC code used during an ECC encoding process. According to a result of the error correction decoding process, the ECC component may output a signal, for example, an error correction success/fail signal. When the number of error bits is more than a threshold value of correctable error bits, the ECC component may not correct the error bits, and instead may output an error correction fail signal.

The ECC component may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the error correction is not limited to any particular technique, and the ECC component is not limited to any specific structure. As such, the ECC component may include any and all circuits, modules, systems or devices for suitable error correction.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or externally to the controller 130. FIG. 1 shows the memory 144 disposed within the controller 130. In another embodiment, the memory 144 may be embodied by an external volatile memory having a memory interface transferring data between the memory 144 and the controller 130.

As described above, the memory 144 may store data required for performing a data write/read operation between the host 102 and the memory device 150 and data when the data write/read operation is performed. As shown in FIG. 1, the memory 144 may include a cache 146.

The processor 134 may control overall operations of the memory system 110. In particular, the processor 134 may control a program or read operation on the memory device 150 in response to a write or read request from the host 102. As shown in FIG. 1, a FTL 136 may be driven as firmware in the processor 134. The processor 134 may be implemented with a microprocessor or central processing unit (CPU).

The memory device 150, for example, a flash memory device may not support an overwrite function. The unit of an erase operation performed by the memory device 150 may be larger than the unit of a write operation. Therefore, when the memory device 150 updates data stored therein, the memory device may not perform an erase operation on a region where the corresponding data are stored, but invalidate the existing data and store new data in another memory region. In this case, a logical address of the host 102 may not coincide with a physical address of the memory device 150.

When receiving a logical address from the host 102, the FTL 136 may translate the logical address into a physical address. Therefore, the controller 130 may access the physical address of the memory device 150 in response to an access request from the host 102.

Map data for associating the logical address with the physical address, for example, Logical to Physical (L2P) data may be stored in the memory device 150. The FTL 136 may acquire the map data from the memory device 150 in order to translate the logical address into the physical address.

The memory device 150 may store plural pieces of map data on a map segment basis. The memory device 150 may store a plurality of map segments. In this specification, map data required by the FTL 136 is defined as request map data, and a map segment including the request map data is defined as a request map segment.

The FTL 136 may control the memory interface 142 to acquire the request map data from the memory device 150. The memory interface 142 may control the memory device 150 to read the request map segment in response to the control of the FTL 136. The memory interface 142 may cache the request map segment read from the memory device 150 into the cache 146. The FTL 136 may acquire the request map data from the cached request map segment.

The plural pieces of map data included in the request map segment may be cached in a caching order, which may be predetermined. Therefore, before all of the map data are completely cached, the request map data may be cached into the cache 146. When the request map data is cached, the FTL 136 may acquire the request map data even before the entire request map segment is completely cached. This case will be described in detail with reference to FIGS. 3 to 7.

In accordance with an embodiment, the FTL 136 may determine the caching order based on an offset of the request map data is located in the request map segment while caching the map segment into the cache 146. The FTL 136 may mark data in a marking region which is determined within the cache 146 based on the determined caching order, while requesting the request map data. The FTL 136 may acquire the request map data depending on whether the marked data stored in the marking region has been changed, even before the entire request map segment is completely cached, for example, even when less than a half of the request map segment has been cached. In accordance with an embodiment, the FTL 136 can quickly acquire the request map data, thereby improving the access performance of the memory system 110.

Figure 2:
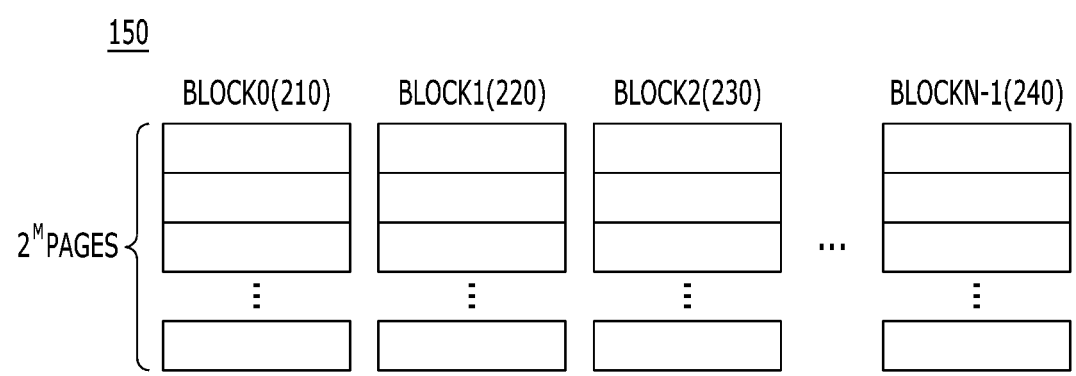
FIG. 2 schematically illustrates blocks of a memory device which operates according to control of the controller in accordance with an embodiment.

FIG. 2 schematically illustrates the memory device 150 which operates according to control of the controller 130 in accordance with an embodiment.

Referring to FIG. 2, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example $2^M$ pages, the number of which may vary according to circuit design. For example in some applications, each of the memory blocks may include M pages. Each of the pages may include a plurality of memory cells that are coupled to a plurality of word lines WL.

Also, the memory device 150 may include a plurality of memory blocks, which may include a single level cell (SLC) memory block of SLCs each storing 1-bit data and/or a multi-level cell (MLC) memory block of MLCs each storing 2-bit data. The SLC memory blocks may include a plurality of pages that are realized by memory cells storing one-bit data in one memory cell. The SLC memory blocks may have a quick data operation performance and high durability. On the other hand, the MLC memory blocks may include a plurality of pages that are realized by memory cells storing multi-bit data, e.g., data of two or more bits, in one memory cell. The MLC memory blocks may have a greater data storing space than the SLC memory blocks. In other words, the MLC memory blocks may be highly integrated. Particularly, the memory device 150 may include not only the MLC memory blocks, each of which includes a plurality of pages that are realized by memory cells capable of storing two-bit data in one memory cell, but also higher storage capacity MLC memory blocks, such as triple level cell (TLC) memory blocks each of which includes a plurality of pages that are realized by memory cells capable of storing three-bit data in one memory cell, quadruple level cell (QLC) memory blocks each of which includes a plurality of pages that are realized by memory cells capable of storing four-bit data in one memory cell, and/or higher-multiple level cell memory blocks each of which includes a plurality of pages that are realized by memory cells capable of storing five or more-bit data in one memory cell.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

The memory blocks 210, 220, 230 and 240 may store the data transferred from the host 102 through a program operation, and transfer data stored therein to the host 102 through a read operation.

Figure 3:
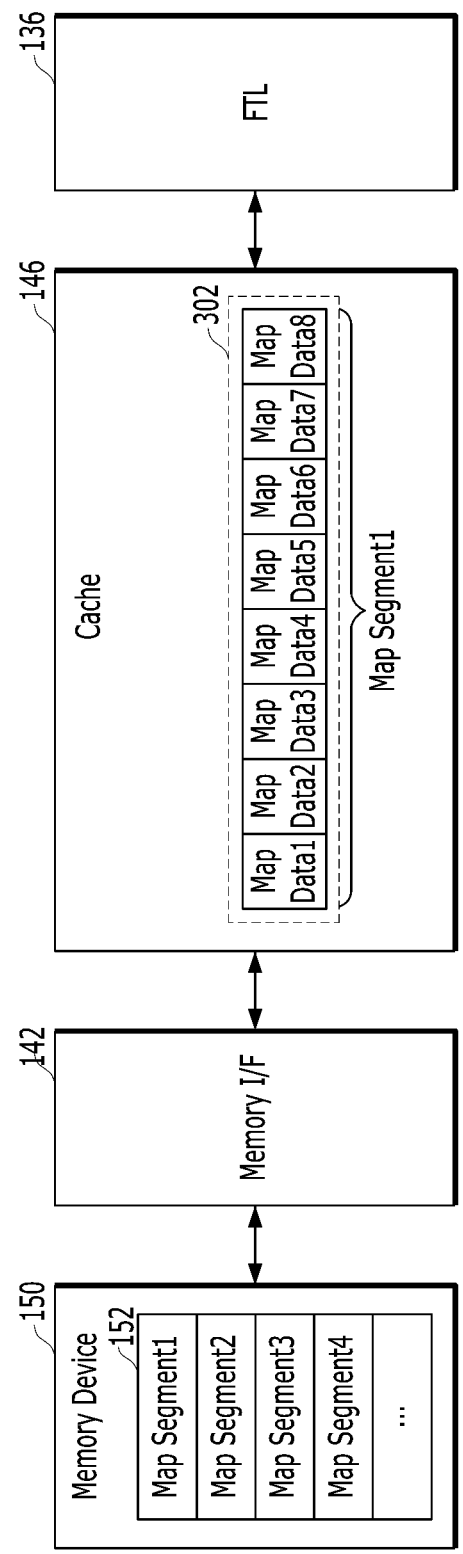
FIG. 3 is a diagram illustrating a process in which an FTL acquires request map data from the memory device.

FIG. 3 is a diagram illustrating a process in which the FTL 136 acquires request map data from the memory device 150.

The memory device 150 may store a plurality of map segments. FIG. 3 illustrates that first to fourth map segments Map Segment1 to Map Segment4 are stored in a memory block 152.

Each of the map segments may include plural pieces of map data. For example, one map segment may include plural pieces of map data on a plurality of consecutive logical addresses. One map segment may be stored in one or more pages of a memory block. A single piece of map data may have a size of a data bus, that is, one word. However, the sizes of the map segment and the map data are not limited thereto. FIG. 3 illustrates that one map segment (e.g., first map segment Map Segment1) is stored in one page of the memory block 152 and includes eight map data Map Data1 to Map Data8.

The FTL 136 may provide a descriptor to the memory interface 142 in order to acquire request map data. The descriptor may indicate a work order describing works which the memory interface 142 needs to process in order to control the memory device 150. The memory interface 142 may control the memory device 150 to read a request map segment including the request map data in response to the descriptor.

The descriptor may include a physical address of the memory device 150, corresponding to the location where the request map segment is stored, and a cache address of the cache 146, in which the map segment read from the memory device 150 is to be cached. The physical address may be stored in the memory 144 in advance. The FTL 136 may acquire the physical address of the memory device 150, in which the request map segment is stored, from the memory 144 in order to provide the descriptor.

By way of example, the case in which the request map segment is the first map segment Map Segment1 and the request map data is the fourth map data Map Data4 of the first map segment Map Segment1 will be taken as an example for description.

The memory interface 142 may cache the first map segment Map Segment1 read from the memory device 150 into a first cache region 302 in response to the descriptor. Specifically, the memory interface 142 may cache plural pieces of map data included in the first map segment Map Segment1 in the predetermined caching order. The first cache region 302 of FIG. 3 may correspond to the cache address included in the descriptor.

In an embodiment, the memory interface 142 may perform error correction on the read first map segment using an internal ECC component (not illustrated) and cache the corrected first map segment Map Segment1 into the first cache region 302 in the caching order.

Figure 4:
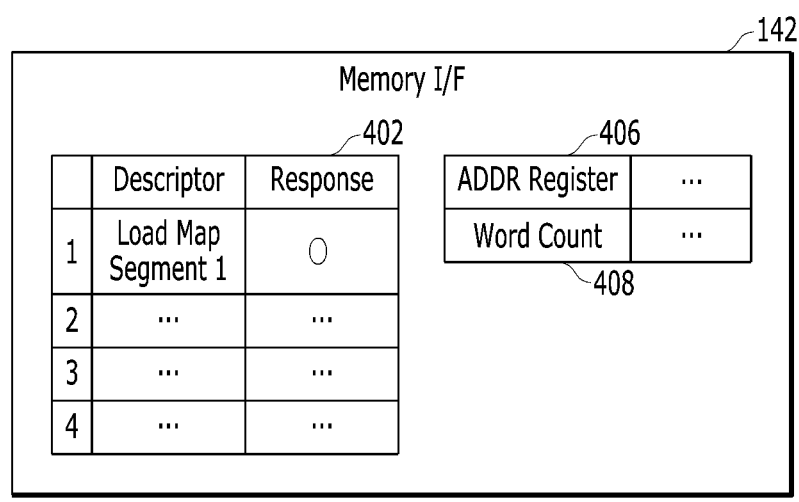
FIG. 4 schematically illustrates a structure of a memory interface.

FIG. 4 schematically illustrates the structure of the memory interface 142 described with reference to FIG. 3.

The memory interface 142 may include registers required for an internal operation. For example, the memory interface 142 may include a descriptor queue register 402, an address register 406 and a word count register 408.

The descriptor queue register 402 may queue a descriptor received from the FTL 136. The memory interface 142 may assign a descriptor number to the received descriptor and provide the assigned number to the FTL 136. In the example of FIG. 4, a descriptor Load Map Segment1 indicating a read request for the first map segment Map Segment1 may be queued in the descriptor queue register 402, and a descriptor number '1' may be assigned to the descriptor Load Map Segment1.

The address register 406 may store a cache address indicating cache location where data is now being cached. When the caching of the request map segment starts, the memory interface 142 may initially store, within the descriptor queue register 402, a cache address indicating a starting cache location from which the caching is started. The word count register 408 may store the size of map data remaining to be cached, on a word basis, for example.

In the example of FIG. 3, the start cache address may correspond to the start address of the first cache region 302. As the map data of the request map segment are cached into the cache 146, the memory interface 142 may increase the value of the cache address in the address register 406 and decrease, in the word count register 408, the value of the remaining map data size to be cached, whenever the map data of one word are cached into the cache 146. Then, the memory interface 142 may cache the subsequent map data having the word-size.

The memory interface 142 may repeat the operation of decreasing the value of the remaining map data size to be cached in the word count register 408 until such value becomes '0', that is, until all of the map data are cached in the cache 146. In other words, the memory interface 142 may cache plural pieces of map data into the first cache region 302 in a determined caching order.

The caching order may be the same as the order that the plural pieces of map data are positioned in the request map segment.

For example, when the request map segment includes plural pieces of map data on a plurality of consecutive logical addresses, the memory interface 142 may cache the plural pieces of map data in an order of the consecutive logical addresses.

In the example of FIG. 4, the memory interface 142 may sequentially cache the first to eighth map data (e.g., Map Data1, Map Data2, . . . , Map Data7 and Map Data8) into the first cache region 302 while changing the values within the address register 406 and the word count register 408.

The FTL 136 may access the first cache region 302 of the cache 146 and acquire the fourth map data or the request map data.

The fourth map data or the request map data may be already cached in the cache 146 before the all map data of the request map segment are completely cached. According to the related art, however, the FTL 136 accesses the cache 146 to acquire the request map data, only when it is confirmed that the plural pieces of map data of the request map segment are all completely cached and the operation of the descriptor is completed.

Specifically, when the operation of the individual descriptor queued in the descriptor queue register 402 is completed, the memory interface 142 may provide a response indicating operation completion to the FTL 136. For example, when the memory interface 142 provides a response by changing the data of the response field ("Response") within the descriptor queue register 402, the FTL 136 may access the descriptor queue register 402 according to a memory mapped input/output (MMIO) method, and confirm whether the operation of the descriptor is completed.

A situation may occur in which a descriptor number, which is assigned to a first descriptor requesting request map data, is assigned to a second descriptor even before the operation of the first descriptor is completed. In this case, the FTL 136 may not confirm whether the operation of the first descriptor is completed. Only after the completion of the operation of the second descriptor is confirmed, the FTL 136 may access the cache 146 to acquire the request map data. According to the related art, the access performance of the memory system 110 may be degraded.

Therefore, even before the completion of the operation (i.e., caching operation of caching the request map segment) of the descriptor is confirmed, the FTL 136 may check whether the request map data is cached and then acquire the request map data.

Figure 5:
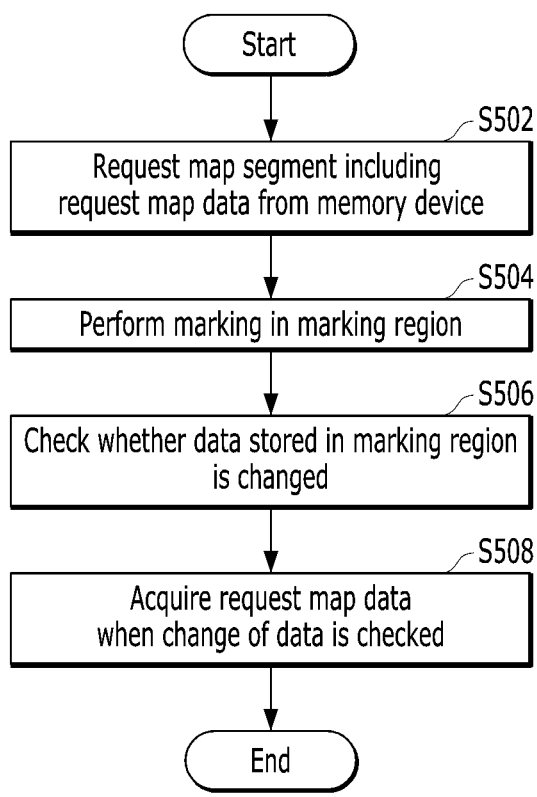
FIG. 5 is a flowchart illustrating an operation of the FTL in accordance with an embodiment.
Figure 6A:
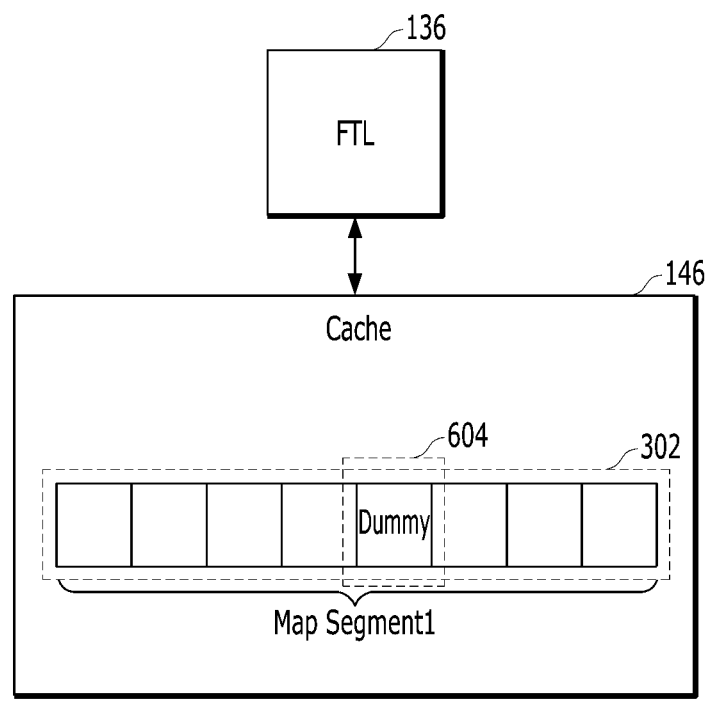
FIGS. 6A to 6C are diagrams illustrating an operation of the FTL in accordance with an embodiment.
Figure 6B:
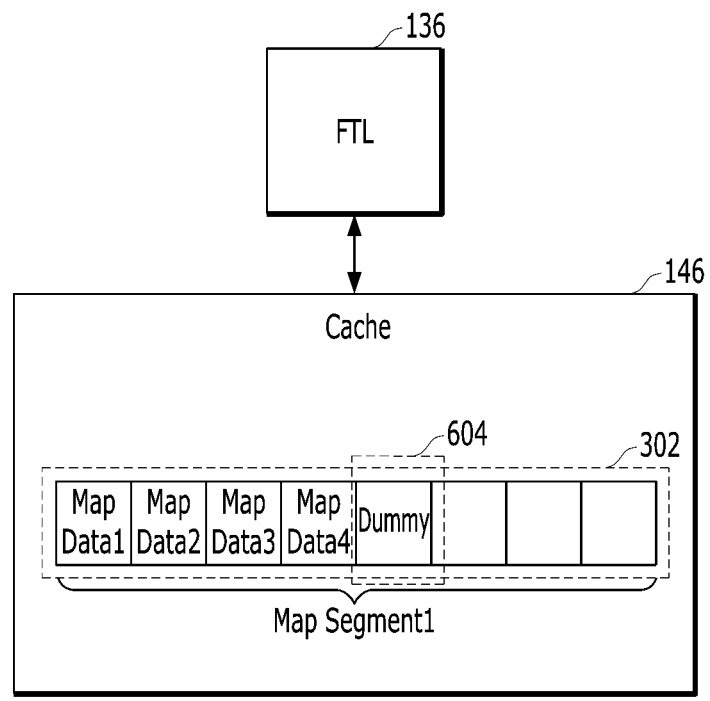
Figure 6C:
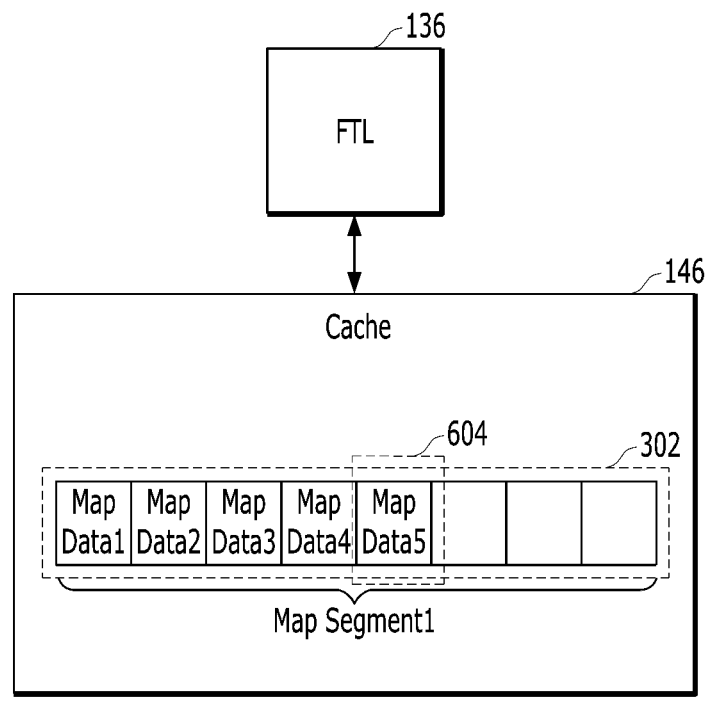

FIG. 5 is a flowchart illustrating the operation of the FTL 136 in accordance with an embodiment. FIGS. 6A to 6C are diagrams illustrating the operation of the FTL 136 in accordance with an embodiment.

FIGS. 5 to 6C illustrate the case in which the request map segment is the first map segment Map Segment1 and the request map data is the fourth map data Map Data4.

Referring to FIGS. 5 and 6A, the FTL 136 may request a request map segment including request map data from the memory device 150 at step S502. As described above, the FTL 136 may provide the memory interface 142 with a descriptor including a physical address indicating a storage location of the request map segment within the memory device 150 and a cache address indicating the first cache region 302 to cache the request map segment.

As described with reference to FIGS. 3 and 4, the memory interface 142 may cache plural pieces of map data into the first cache region 302 in the predetermined caching order. For example, the memory interface 142 may cache the plural pieces of map data into the first cache region 302 in the order in which the plural pieces of map data are located in the request map segment.

Therefore, a cache region into which the fourth map data or the request map data is to be cached may be determined based on the caching order, and thus the cache address indicating the cache region may also be determined according to the caching order.

At step S504, the FTL 136 may determine a marking region 604 into which subsequent map data is to be cached after the request map data has been cached. For example, when the fourth map data is the request map data, a cache region where the fifth map data is to be cached may be determined as the marking region 604. The caching order and the cache region is determined as described above and thus the marking region may be identified and determined. Then, the FTL 136 may mark the marking region 604. The marked data is a mark for checking whether map data are cached in the cache region.

The marking may be performed by storing dummy data in the marking region 604.

At step S506, the FTL 136 may check whether the data stored in the marking region 604 has been changed.

The FTL 136 may periodically check whether the data has been changed.

The FTL 136 may check whether the data has been changed, using a polling method.

FIGS. 6B and 6C illustrate that the map data are cached into the first cache region 302 in the caching order from the first map data, after the marking has been performed in the marking region 604.

Specifically, FIG. 6B illustrates that the first to fourth map data are cached in the first cache region 302, and the dummy data is not yet changed within the marking region 604.

Specifically, FIG. 6C illustrates that the fifth map data is further cached into the marking region 604 within the first cache region 302 and thus the dummy data of the marking region 604 is changed to the fifth map data. When it is checked that the data stored in the marking region 604 has been changed to the map data, it may indicate that the fourth map data is cached according to the caching order.

Therefore, when it is determined that the data stored in the marking region 604 has changed, the FTL 136 may access the first cache region 302 to acquire the fourth map data or the request map data at step S508.

FIG. 7 is a flowchart illustrating an operation of the memory system 110 including the controller 130 in accordance with an embodiment.

At step S702, the FTL 136 may provide to the memory interface 142 a descriptor requesting a request map segment including request map data. The descriptor may include a physical address indicating a storage location of the request map segment within the memory device 150, and a cache address indicating the first cache region 302.

At step S704, the FTL 136 may determine, as the marking region 604, a cache region into which the subsequent map data is to be cached after the request map data according to the caching order, which may be predetermined, in the cache 146 and then mark the marking region 604.

At step S706, the FTL 136 may periodically check whether the data stored in the marking region 604 is changed. In an embodiment, the FTL 136 may periodically poll the cache 146.

At step S708, the memory interface 142 may control the memory device 150 to read the request map segment in response to the descriptor.

The memory device 150 may read the request map segment in response to the control of the memory interface 142 at step S710, and provide the request map segment to the memory interface 142 at step S712.

At step S714, the memory interface 142 may cache the read request map segment into the cache 146 in the caching order. In an embodiment, the memory interface 142 may perform error correction on the read request map segment using an internal ECC component (not illustrated), and cache the corrected request map segment into the cache 146 in the caching order.

When it is determined through the periodic checks (step S706) that the dummy data has changed, the FTL 136 may acquire the request map data from the cache 146 at step S716.

The FTL 136 may perform the operations of steps S702 to S716 in response to an access request of the host 102. As a result, the FTL 136 may acquire the request map data, and translate a logical address contained in the access request of the host 102 into a physical address of the memory device 150. The FTL 136 may access the translated physical address of the memory device 150 in response to the access request.

Even after the FTL 136 acquires the request map data, the memory interface 142 may perform a caching operation on the map segments in order to completely cache the entire map segments.

The FTL 136 may mark dummy data in the marking region 604 while requesting the request map segment, and check whether the marked dummy data is changed. Thus, even before the entire request map segment is completely cached, the FTL 136 may check whether the request map data is cached. Therefore, the FTL 136 can quickly acquire the request map data, thereby improving the access performance of the memory system 110.

In the example of FIG. 3, the request map data is the eighth map data Map Data8 of the first map segment Map Segment1. For example, when the memory interface 142 caches the plural pieces of map data into the first cache region 302 in the order that the plural pieces of map data are positioned in the request map segment, the eighth map data may be finally cached.

When the request map data is the last map data within the request map segment according to the caching order, the FTL 136 cannot set a marking region because there is no cache region into which map data is to be cached after the request map data is cached. In this case, the FTL 136 may acquire the request map data or the last map data within the request map segment only when it is determined that the operation of the descriptor is completed after the request map segment is completely cached.

Furthermore, when the position where the request map data is stored in the request map segment is in the latter half of the request map segment, the memory interface 142 may acquire the request map data after caching at least the first half of the request map segment.

In accordance with an embodiment, the memory interface 142 may set the caching order the order in which the plurality of map data are located in the request map segment (forward order) or the reverse of the order that the plurality of map data are located (reverse order), based on the position where the request map data is located in the request map segment, e.g., the offset. Based on the set caching order, the memory interface 142 may mark a cache region into which the map data is to be cached after the request map data is cached, which is a marking region. Then, the memory interface 142 may acquire the request map data depending on whether the dummy data stored in the marking region is changed. The present embodiment will be described in detail with reference to FIGS. 4 and 8 to 11.

Referring back to FIG. 4, the memory interface 142 may cache plural pieces of map data in the order that the plural pieces of map data are located in the request map segment, while changing the values of the address register 406 and the word count register 408.

In the example of FIG. 3, the start cache address may correspond to the start address of the first cache region 302. The memory interface 142 may increase the value of the address register 406 and decrease the value of the word count register 408, whenever a piece of map data of one word-size is cached. Then, the memory interface 142 may cache the subsequent map data.

For another example, the start cache address may correspond to the last address of the first cache region 302. In this case, the memory interface 142 may decrease the value of the address register 406 and decrease the value of the word count register 408, whenever each piece of map data having the word-size is cached. Then, the memory interface 142 may cache the subsequent map data.

The memory interface 142 may repeat the operation of decreasing the value of the word count register 408, until the value of the word count register 408 becomes '0', that is, until all of the data to be cached are completely cached. In other words, the memory interface 142 may cache the plural pieces of map data into the first cache region 302 in the reverse order of the order that the plural pieces of map data are located in the request map segment.

For example, when a single piece of map data corresponds to the word-size, the memory interface 142 may increase the value of the address register 406 and decrease the value of the word count register 408 whenever a single piece of map data is cached. Then, the memory interface 142 may cache the next map data.

In an embodiment, when the request map segment includes plural pieces of map data on a plurality of consecutive logical addresses, the memory interface 142 may cache the plural pieces of map data in the reverse of the order of the logical addresses.

In short, while changing the values of the address register 406 and the word count register 408, the memory interface 142 may cache the plural pieces of map data included in the first map segment into the first cache region 302 in the forward order or the reverse order of the logical addresses. That is, the caching order may be the forward order or the reverse order with reference to the logical addresses of the plural pieces of map data within the map segment.

Regardless of the forward and backward orders as the caching order, the arrangement of the cache locations for the respective pieces of map data may be predetermined as the forward order of the logical addresses, as described above with reference to FIGS. 3 and 4. Even when the plurality of map data are cached in the reverse order, the positions where the plurality of map data are cached in the cache may not be different from the positions where the plurality of map data are located in the request map segment. That is, regardless of whether the plural pieces of map data are cached in the forward or reverse order, the same map data may be cached at the same cache position. The case in which the plurality of map data are cached in the forward order and the case in which the plurality of map data are cached in reverse order differ only in terms of which map data is first cached.

Figure 8:
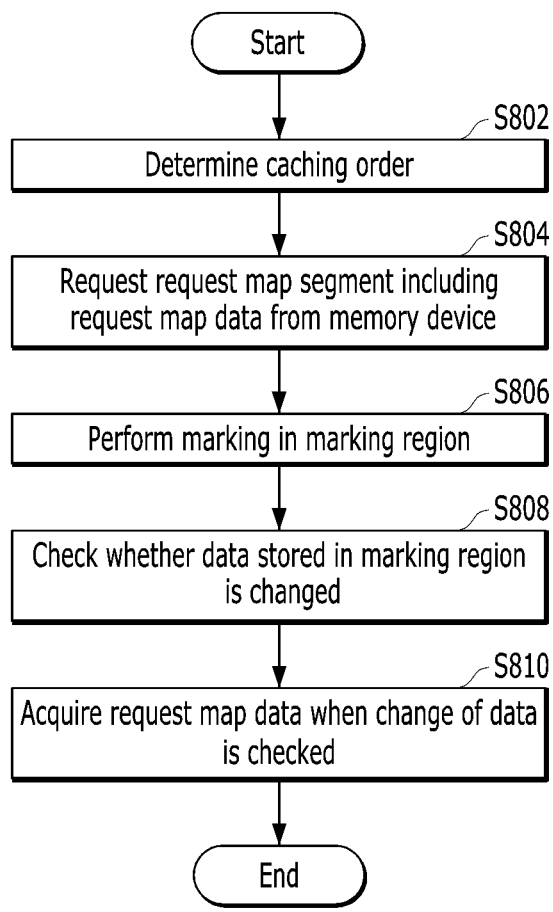
FIG. 8 is a flowchart illustrating an operation of the FTL in accordance with an embodiment.

FIG. 8 is a flowchart illustrating the operation of the FTL 136 in accordance with an embodiment.

Figure 9:
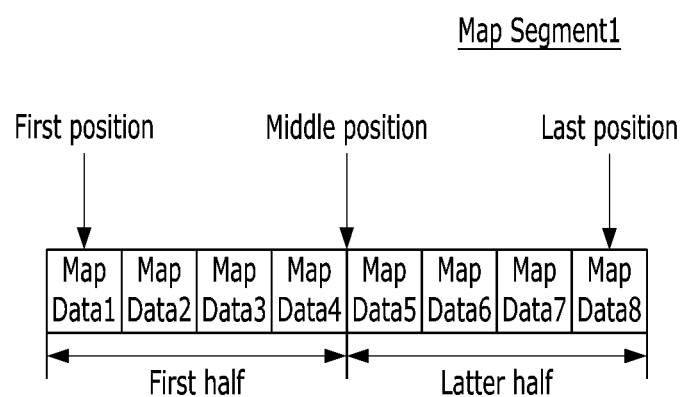
FIGS. 9 to 10C are diagrams illustrating an operation of the FTL in accordance with an embodiment.
Figure 10A:
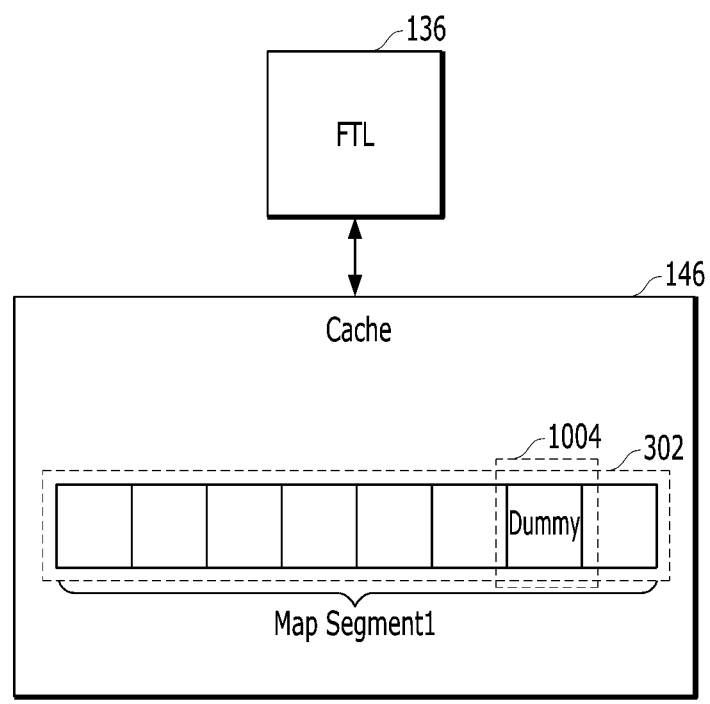
Figure 10B:
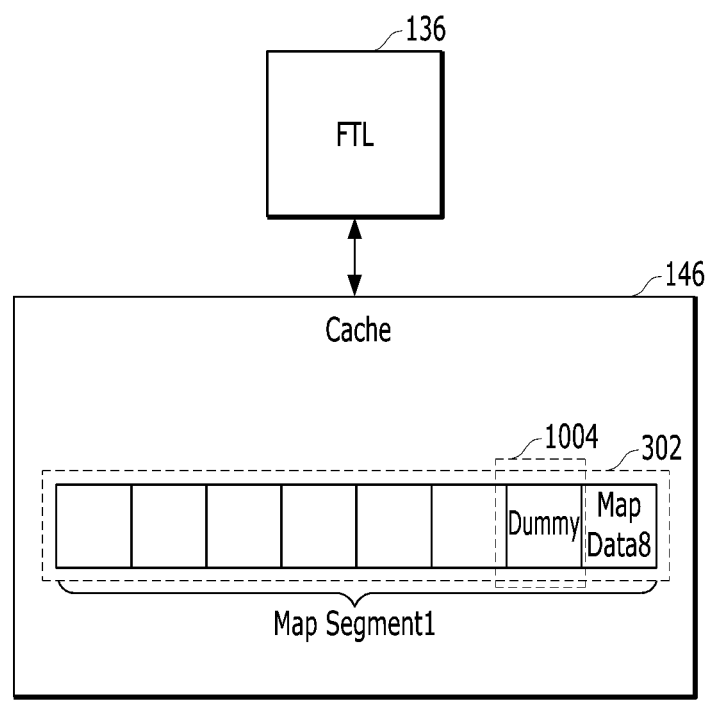
Figure 10C:
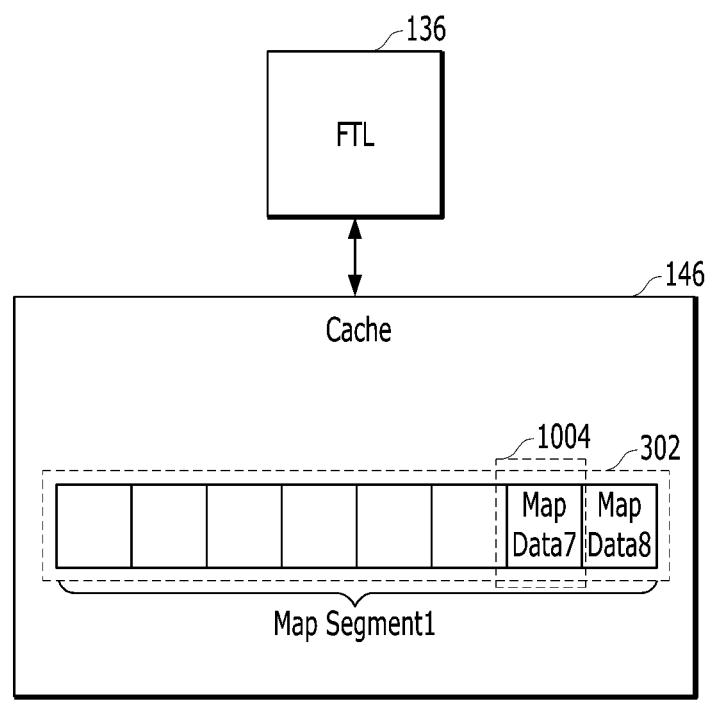

FIGS. 9 to 10C are diagrams illustrating the operation of the FTL 136 in accordance with an embodiment.

By way of example, the case in which the request map segment is the first map segment Map Segment1 and the request map data is the eighth map data Map Data8 is described.

At step S802, the FTL 136 may determine the caching order in which the request map segment is to be cached into the first cache region 302, before requesting the request map segment from the memory device 150.

As described with reference to FIG. 4, the caching order may be the order in which the plural pieces of map data are located in the request map segment or the reverse of that order.

The FTL 136 may determine the caching order based on the position where the request map data is located in the request map segment, e.g., the offset.

Referring to FIG. 9, the plural pieces of map data may be sequentially arranged from the first map data Map Data1 at the first position to the eighth map data Map Data8 at the last position within the first map segment Map Segment1 according to the logical addresses thereof. Based on the first position and the last position, the middle position may be determined. In the example of FIG. 9, map data located within the first half of the request map segment Map Segment1 are the first to fourth map data (Map Data1 to Map Data4), and map data located within the latter half of the request map segment Map Segment1 are the fifth to eighth map data (Map Data5 to Map Data8).

When the position where the request map data is located in the request map segment Map Segment1 is within the first half of the request map segment Map Segment1, the caching order may be determined as the forward order of the logical addresses of the map data of the request map segment Map Segment1.

On the contrary, when the position where the request map data is located in the request map segment Map Segment1 is within the latter half of the request map segment Map Segment1, the caching order may be determined as the reverse order of the logical addresses of the map data of the request map segment Map Segment1. That is, when the request map data is any one of the fifth to eighth map data in the example of FIG. 9, the FTL 136 may determine the caching order indicates to cache the data in the reverse order from the eighth map data.

At step S804, the FTL 136 may request the request map segment including the request map data from the memory device 150. The FTL 136 may provide the memory interface 142 with a descriptor including a physical address indicating a storage location of the request map segment within the memory device 150 and a cache address indicating the first cache region 302 to cache the request map segment as well as the determined caching order.

At step S806, the FTL 136 may determine a marking region into which a subsequent map data is to be cached according to the determined caching order after the request map data is cached and then mark data in the marking region.

Referring to FIG. 10A, the FTL 136 may determine a cache region for the seventh map data Map Data7 as the marking region 1004 due to the determined caching order (i.e., the reverse order of the logical addresses from the eighth map data Map Data8). Then, the FTL 136 may mark data in the marking region 1004.

In an embodiment, the FTL 136 may perform the marking by storing dummy data in the marking region 1004.

The dummy data is distinguishable from the map data so as not to be confused with the map data.

At step S808, the FTL 136 may check whether the data stored in the marking region 1004 is changed.

In an embodiment, the FTL 136 may periodically check whether the data is changed.

In an embodiment, the FTL 136 may check whether the data is changed, through a polling method.

FIGS. 10B and 10C illustrate that the map data are cached into the first cache region 302 in the caching order from the eighth map data, after the marking has been performed in the marking region 1004.

Specifically, FIG. 10B illustrates that the eighth map data is cached in the first cache region 302, and the dummy data is not yet changed within the marking region 1004.

Specifically, FIG. 10C illustrates that the seventh map data is further cached in the marking region 1004 within the first cache region 302 and thus the dummy data of the marking region 1004 is changed to the seventh map data. When it is determined that the data stored in the marking region 1004 has been changed to the map data, it may indicate that the eighth map data is cached according to the caching order determined at step S802.

Therefore, when the change of the data stored in the marking region 1004 is checked, the FTL 136 may access the cache 146 to acquire the eighth map data or the request map data at step S810.

Figure 11:
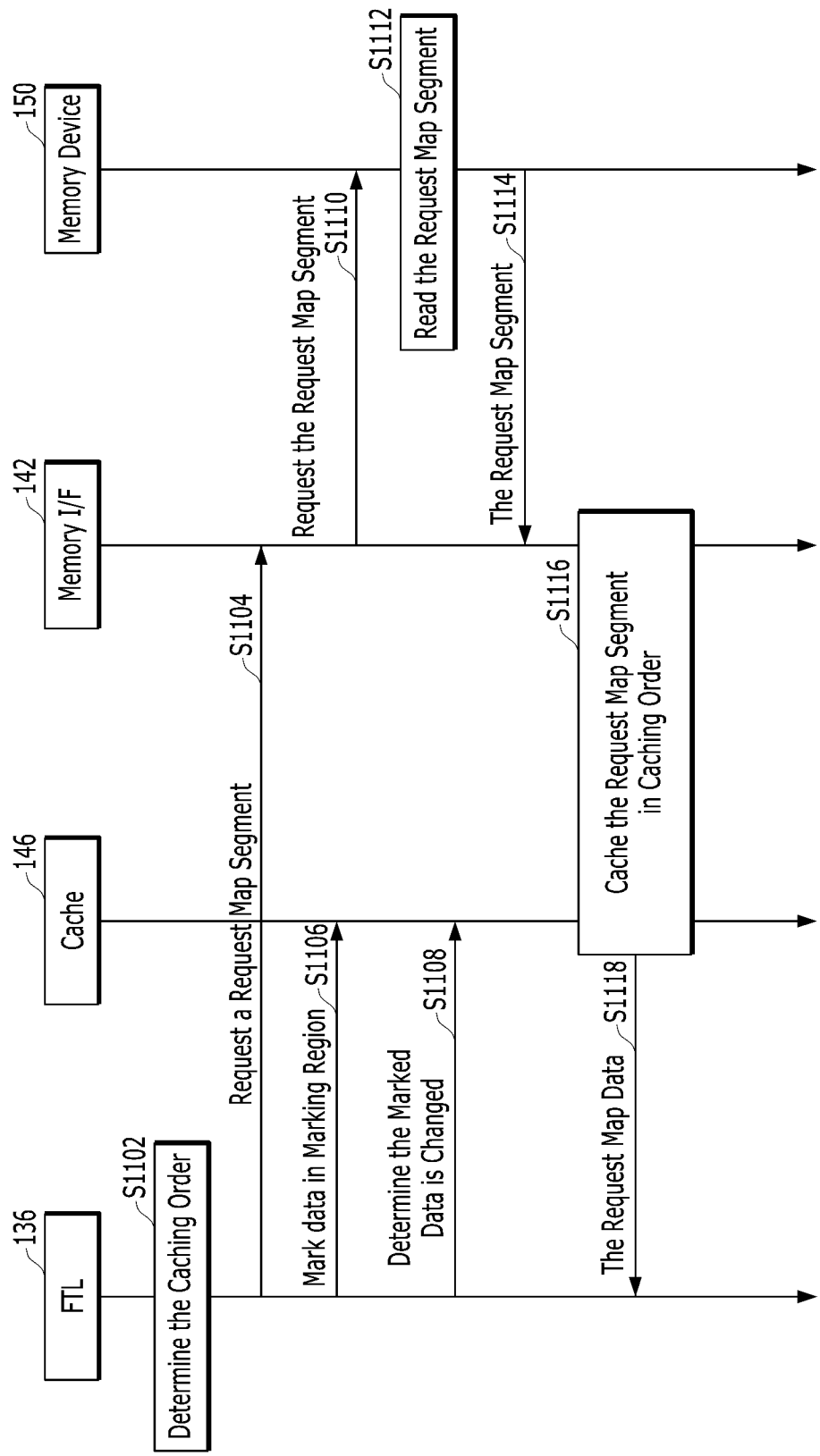
FIG. 11 is a flowchart illustrating an operation of the memory system including the controller in accordance with an embodiment.

FIG. 11 is a flowchart illustrating an operation of the memory system 110 including the controller 130 in accordance with an embodiment.

At step S1102, the FTL 136 may determine the caching order before requesting a request map segment from the memory device 150.

As described above, the FTL 136 may set the caching order to the order in which the plural pieces of map data are located in the request map segment or the reverse of that order.

At step S1104, the FTL 136 may provide the memory interface 142 with a descriptor requesting a request map segment including request map data. The descriptor may include a physical address indicating a storage location of the request map segment within the memory device 150, and a cache address indicating the first cache region 302 as well as the determined caching order.

At step S1106, the FTL 136 may determine, as the marking region 1004, a cache region into which the subsequent map data is to be cached after the request map data according to the caching order in the cache 146 and then mark the marking region 604. The marking region 604 into which the subsequent piece of map data is to be cached after the request map data is cached may be determined based on the determined caching order.

At step S1108, the FTL 136 may periodically check whether the data stored in the marking region 1004 is changed. In an embodiment, the FTL 136 may periodically poll the cache 146.

At step S1110, the memory interface 142 may control the memory device 150 to read the request map segment in response to the descriptor.

The memory device 150 may read the request map segment in response to the control of the memory interface 142 at step S1112, and provide the request map segment to the memory interface 142 at step S1114.

At step S1116, the memory interface 142 may cache the read request map segment into the cache 146 in the caching order determined at step S1102. In an embodiment, the memory interface 142 may perform error correction on the read request map segment using an internal ECC component (not illustrated), and cache the corrected request map segment into the cache 146 in the determined caching order.

When it is determined through the periodic checks (step S1108) that the dummy data of the marking region 1004 has changed, the FTL 136 may acquire the request map data from the cache 146 at step S1118.

The FTL 136 may perform the operations of steps S1102 to S1118 in response to an access request of the host 102. As a result, the FTL 136 may acquire the request map data, and translate a logical address contained in the access request of the host 102 into a physical address of the memory device 150. The FTL 136 may access the translated physical address of the memory device 150 in response to the access request.

Even after the FTL 136 acquires the request map data, the memory interface 142 may perform the caching operation on the map segments in order to completely cache the entire map segments.

In accordance with an embodiment, the FTL 136 may determine the caching order based on the position where the request map data is located in the request map segment, e.g., the offset, while requesting map data. The FTL 136 may mark the marking region which is determined based on the determined caching order. The FTL 136 may acquire the request map data depending on whether the data stored in the marking region is changed.

In accordance with an embodiment, the FTL 136 may acquire request map data when less than half of the plural pieces of map data included in the request map segment are cached. That is, the FTL 136 can rapidly acquire the request map data, thereby improving the access performance of the memory system 110.

FIGS. 12 to 20 are diagrams schematically illustrating application examples of the data processing system of FIGS. 1 to 11 according to various embodiments.

Figure 12:
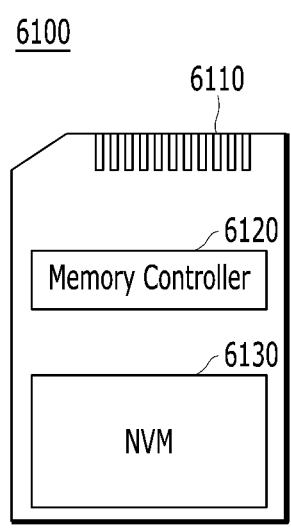
FIGS. 12 to 20 schematically illustrate examples of a data processing system including a memory system in accordance with various embodiments.

FIG. 12 is a diagram schematically illustrating the data processing system including the controller in accordance with an embodiment. FIG. 12 schematically illustrates a memory card system 6100 to which the controller may be applied.

Referring to FIG. 12, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system may be applied to wired and/or wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). In another embodiment, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., SD, miniSD, microSD and SDHC) and/or a universal flash storage (UFS).

Figure 13:
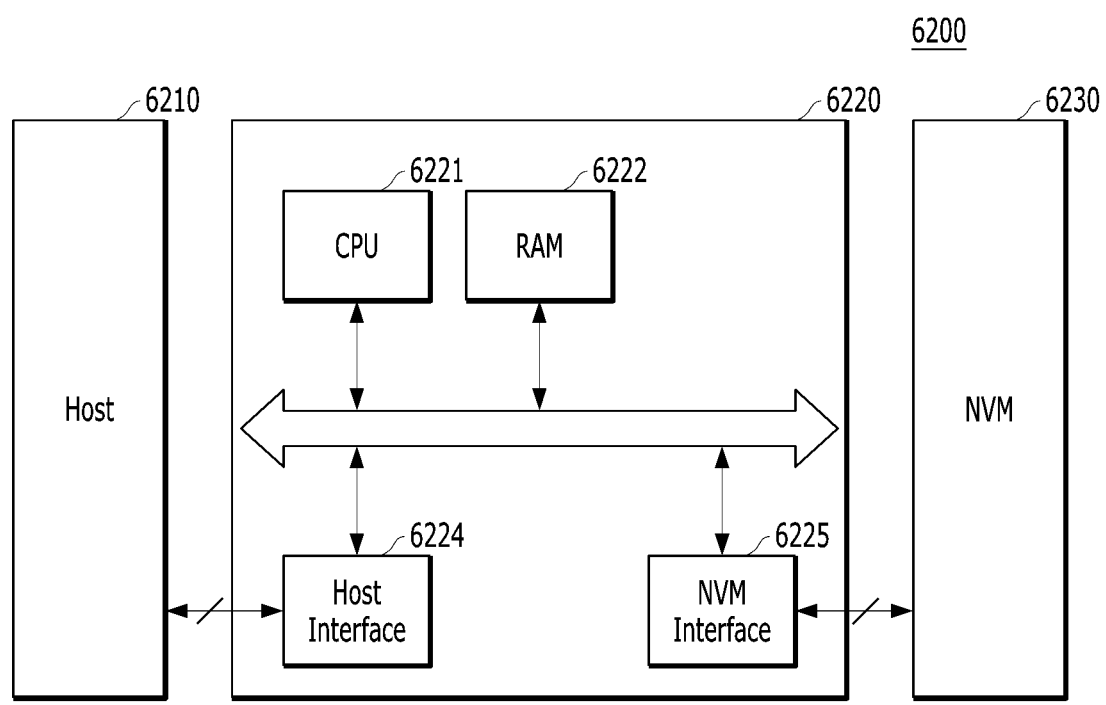

FIG. 13 is a diagram schematically illustrating another example of a data processing system 6200 including the controller in accordance with an embodiment.

Referring to FIG. 13, the data processing system 6200 may include a memory device 6230 having one or more nonvolatile memories (NVMs) and a memory controller 6220 for controlling the memory device 6230. The data processing system 6200 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The memory controller 6220 may exchange data with the host 6210 through the host interface 6224, and exchange data with the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then exchange data with the external device. In particular, as the memory controller 6220 is configured to communicate with the external device through one or more of various communication protocols, the memory system and the data processing system may be applied to wired and/or wireless electronic devices, particularly a mobile electronic device.

Figure 14:
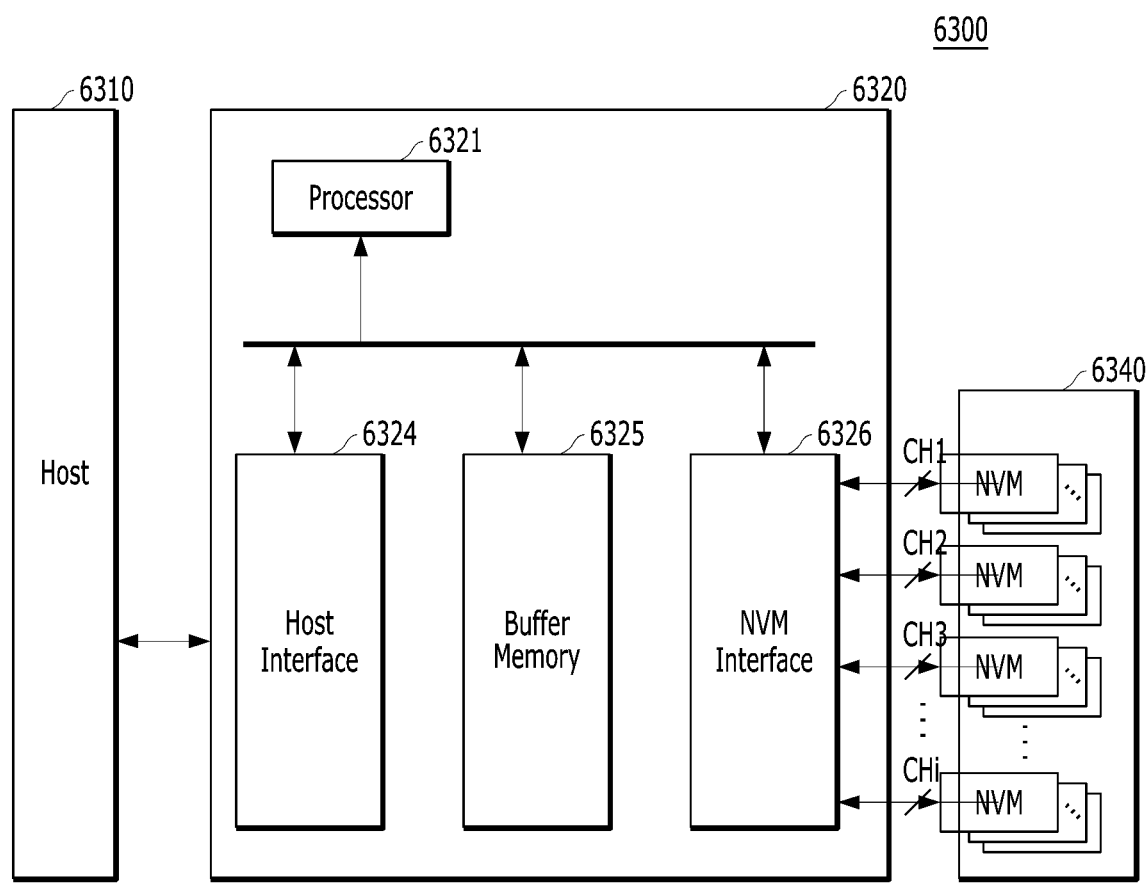

FIG. 14 is a diagram schematically illustrating another example of the data processing system including the controller in accordance with an embodiment. FIG. 14 schematically illustrates a solid state drive (SSD) 6300 to which the memory system may be applied.

Referring to FIG. 14, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to Chi associated with respective groups of NVMs in the memory device 6340. The controller 6320 may include one or more processors 6321, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of a variety of volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). By way of example, FIG. 10 illustrates that the buffer memory 6325 exists in the controller 6320. However, the buffer memory 6325 may be external to the controller 6320.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 15:
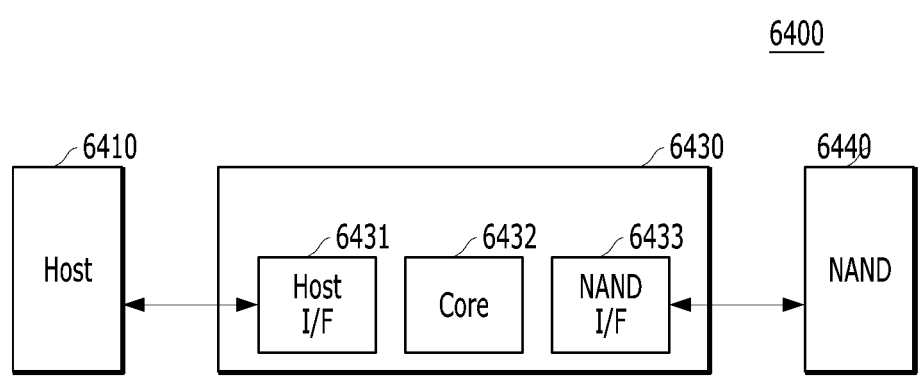

FIG. 15 is a diagram schematically illustrating another example of the data processing system including the controller in accordance with an embodiment. FIG. 15 schematically illustrates an embedded Multi-Media Card (eMMC) 6400 to which the memory system may be applied.

Referring to FIG. 15, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and/or UHS-II interface.

As described above, each of the memory controller 6120, the memory controller 6220, the controller 6320 and the controller 6430, which have been described with reference to FIGS. 12 to 15, may include one or more processors and one or more memory elements. Each of the processors may determine a caching order, and mark data in a cache region into which map data is to be cached after the request map data is cached, while requesting the map data. Then, the processor may check whether the marked data is changed, and acquire the request map data even before half of the map segment including the request map data is completely cached, which makes it possible to improve the access performance of the memory system.

FIGS. 16 to 19 are diagrams schematically illustrating other examples of the data processing system including the memory system in accordance with one or more embodiments. FIGS. 16 to 19 schematically illustrate universal flash storage (UFS) systems to which the memory system may be applied.

The memory systems in accordance with the various embodiments described with reference to FIGS. 1 to 15 may be applied to the UFS described with reference to FIGS. 16 to 19.

Referring to FIGS. 16 to 19, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices or particularly mobile electronic devices through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 13 to 15, and the UFS cards 6530, 6630, 6730 and 6830 may be embodied in the form of the memory card system 6100 described with reference to FIG. 12.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and/or micro-SD.

Figure 16:
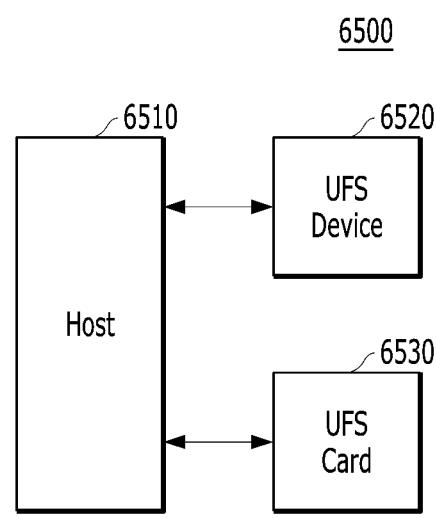

In the UFS system 6500 illustrated in FIG. 16, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 16, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 17:
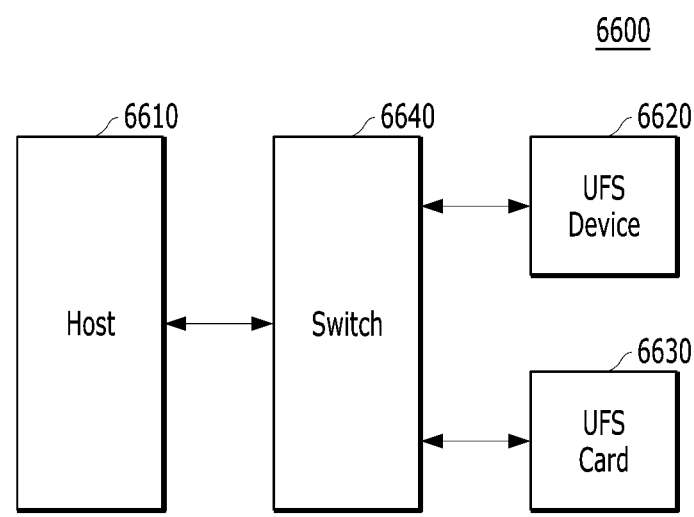

In the UFS system 6600 illustrated in FIG. 17, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 17, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 18:
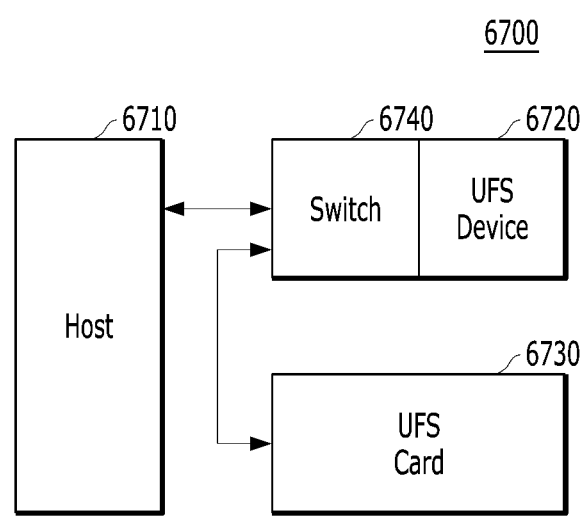

In the UFS system 6700 illustrated in FIG. 18, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or externally to the UFS device 6720. In the embodiment of FIG. 18, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 19:
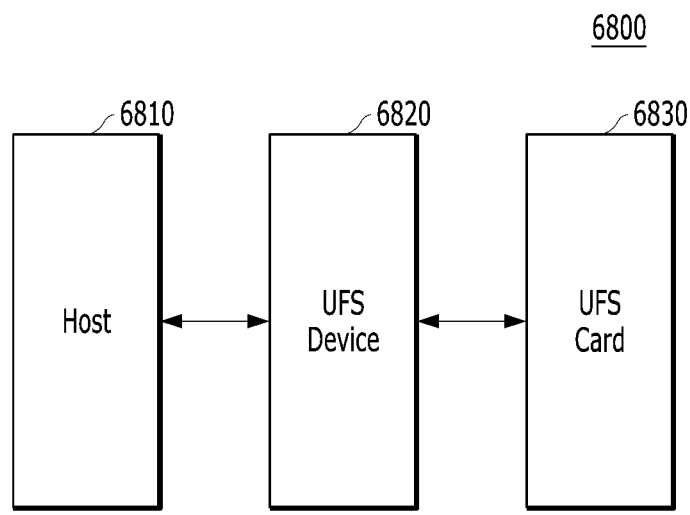

In the UFS system 6800 illustrated in FIG. 19, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In the embodiment of FIG. 19, the configuration in which one UFS device 6820 is connected to the host 6810 and one UFS card 6830 is connected to the UFS device 6820 is illustrated by way of example. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 20:
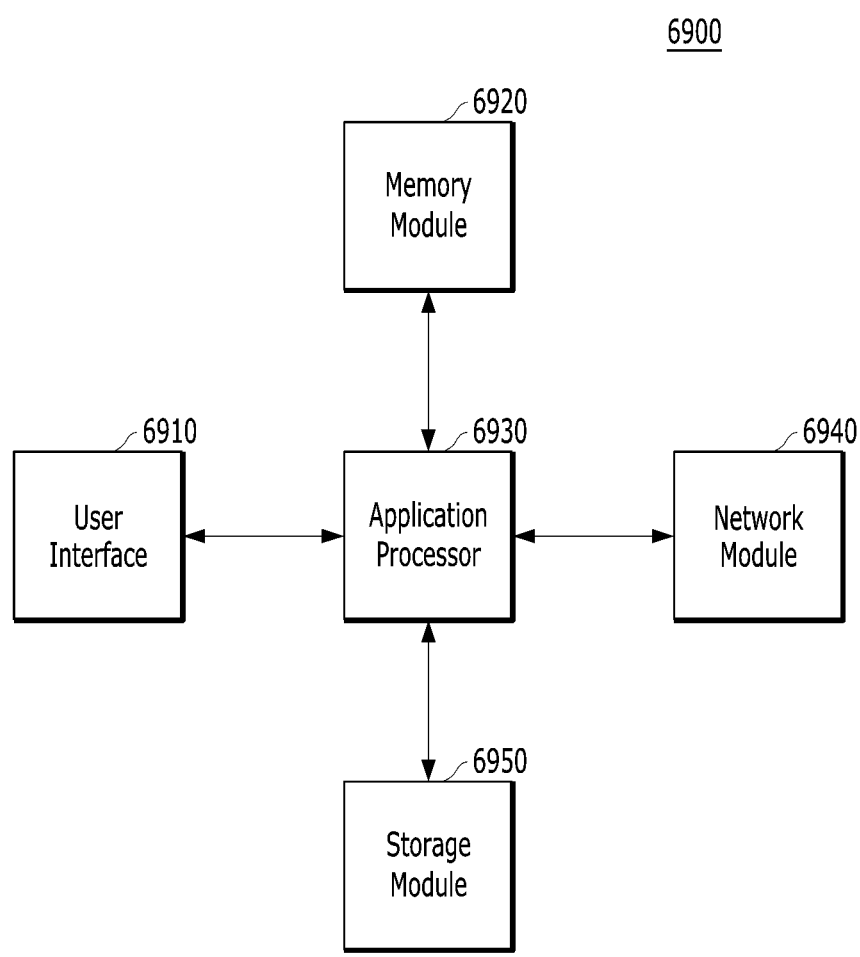

FIG. 20 is a diagram schematically illustrating another example of the data processing system including the memory system in accordance with an embodiment. FIG. 20 is a diagram schematically illustrating a user system 6900 to which the memory system may be applied.

Referring to FIG. 20, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 14 to 19.

In an embodiment, the storage module 6950 may include a device which determines a caching order, marks data in a cache region into which map data is to be cached after request map data is cached, and checks whether the marked data is changed, in order to rapidly acquire the request map data.

The user interface 6910 may include one or more interfaces for inputting data or commands to the application processor 6930 or outputting data to an external device. For example, the user interface 6910 may include any of a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the processor 6930 on a display/touch module of the mobile electronic device, or support a function of receiving data from the touch panel.

In accordance with embodiments of the present invention, a controller which can improve the access performance of a memory system by quickly acquiring map data from a memory device is provided, as is an operation method thereof.

Although various embodiments have been illustrated and described, it will be apparent to those skilled in the art in light of the present disclosure that various changes and modifications may be made without departing from the spirit and scope of the disclosure as defined in the following claims.

What is claimed is:
1. An operation method of a controller which includes a cache and controls a memory device, the operation method comprising:
    determining a caching order of plural pieces of map data included in a request map segment including request map data;
    requesting the request map segment from the memory device;

marking dummy data to be changed by the plural pieces of map data in a marking region of the cache based on the caching order;

caching, in the caching order, the plural pieces of map data read from the memory device; and changing the dummy data with the request map data;

acquiring the request map data from the cached data when the dummy data marked in the marking region is changed.

2. The operation method of claim 1, wherein the determining of the caching order is performed based on a position at which the request map data is located within the request map segment.

3. The operation method of claim 2, wherein the caching order comprises one of an order in which the plural pieces of map data are located in the request map segment (forward order) and the reverse of the order in which the plural pieces of map data are located (reverse order).

4. The operation method of claim 3, wherein the determining of the caching order comprises:

setting the caching order to the forward order when the position at which the request map data is located is in a front half of the request map segment; and setting the caching order to the reverse order when the position at which the request map data is located is in a back half of the request map segment.

5. The operation method of claim 3, wherein the plural pieces of map data correspond to a plurality of consecutive logical addresses, respectively.

6. The operation method of claim 5, wherein the caching order comprises one of the forward order corresponding to a logical address order of the plural pieces of map data and the reverse order corresponding to a reverse of the logical address order.

7. The operation method of claim 1, further comprising periodically checking whether the dummy data marked in the marking region is changed.

8. The operation method of claim 7, wherein the periodically checking of whether the dummy data marked in the marking region is changed is performed by polling.

9. The operation method of claim 1, further comprising determining, as the marking region, a cache region of the cache in which map data is to be cached after the request map data is cached.

10. The operation method of claim 1, further comprising:

receiving an access request from a host;

translating a logical address contained in the access request into a physical address of the memory device based on the acquired request map data; and accessing the translated physical address of the memory device in response to the access request.

11. A controller for controlling a memory device, comprising:

a cache suitable for caching map data;

a flash translation layer (FTL) suitable for:

determining a caching order of plural pieces of map data included in a request map segment including request map data, requesting the request map segment from the memory device, and marking dummy data to be changed by the plural pieces of map data in a marking region which is changed based on the caching order; and a memory interface suitable for caching, in the caching order, the plural pieces of map data read from the memory device and changing the dummy data with the request map data, wherein the FTL acquires the request map data from the cache when the dummy data marked in the marking region is changed.

12. The controller of claim 11, wherein the FTL determines the caching order based on a position at which the request map data is located within the request map segment.

13. The controller of claim 12, wherein the caching order comprises one of an order in which the plural pieces of map data are located in the request map segment (forward order) and the reverse of the order in which the plural pieces of map data are located (reverse order).

14. The controller of claim 13, wherein the FTL sets the caching order to the forward order when the position at which the request map data is located is in a front half of the request map segment, and sets the caching order to the reverse order when the position at which the request map data is located is in a back half of the request map segment.

15. The controller of claim 13, wherein the plural pieces of map data correspond to a plurality of consecutive logical addresses, respectively.

16. The controller of claim 15, wherein the caching order comprises one of the forward order corresponding to a logical address order of the plural pieces of map data and the reverse order corresponding to a reverse of the logical address order.

17. The controller of claim 11, wherein the FTL periodically checks whether the dummy data marked in the marking region is changed.

18. The controller of claim 17, wherein the FTL periodically checks whether the dummy data marked in the marking region is changed through polling.

19. The controller of claim 11, wherein the FTL determines, as the marking region, a cache region of the cache into which map data is to be cached after the request map data is cached.

20. The controller of claim 11, wherein the FTL translates a logical address contained in an access request into a physical address of the memory device, based on the acquired request map data, and accesses the translated physical address of the memory device in response to the access request.

* * * * *